(12) United States Patent
Legan

(10) Patent No.: US 8,477,346 B2
(45) Date of Patent: Jul. 2, 2013

(54) NETWORK BASED PRINT DRIVER CONFIGURATION

(75) Inventor: James David Legan, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1029 days.

(21) Appl. No.: 12/498,765

(22) Filed: Jul. 7, 2009

(65) Prior Publication Data

US 2011/0007342 A1 Jan. 13, 2011

(51) Int. Cl.
*G06F 17/30* (2006.01)
(52) U.S. Cl.
USPC ............... 358/1.15; 358/1.13; 707/799
(58) Field of Classification Search
USPC ............................................. 707/799
See application file for complete search history.

(56) References Cited

U.S. PATENT DOCUMENTS 7,454,482 B2 * 11/2008 Barnard et al. ............... 709/220
2010/0118330 A1 * 5/2010 Feijoo et al. ................ 358/1.15

* cited by examiner

*Primary Examiner* — Twyler Haskins
*Assistant Examiner* — Lennin Rodriguezgonzalez
(74) *Attorney, Agent, or Firm* — Philip E. Blair; Fleit Gibbons Gutman Bongini & Bianco P.L.

(57) ABSTRACT

What is disclosed is a novel system and method for configuring a client print queue in a networked printing environment. In one embodiment, a client print queue corresponding to a server print queue is initialized on a client device. The server print queue is configured with a default location of a configuration file that contains at least one print queue configuration parameter. In response to a command at the client device to utilize the client print queue, the client device receives the default location of the configuration file and retrieves at least one print queue configuration parameter from the configuration file. The client print queue is then configured, also in response to the command at the client device to utilize the client print queue, according to the retrieved at least one print queue configuration parameter.

17 Claims, 3 Drawing Sheets

NETWORK BASED PRINT DRIVER CONFIGURATION

TECHNICAL FIELD

The present invention is directed to systems and methods for configuring printer drivers that access printers over a network.

BACKGROUND

Network based information processing systems generally allow multiple client devices, such as information processing servers and/or personal computers, to share/access one or more printers over a data communications network. Shared printers are typically associated with a print server on which a print driver is installed and configured. When a client device first accesses a particular printer, the configured print driver on the associated print server is typically downloaded to that client device and used to configure the print device. Large enterprises may have several hundred print devices and associated print servers and a large number of client devices that will share/access those devices.

System administrators often pre-configure a print driver before installing it on a given print server. Such pre-configuration includes, for example, changing the device default settings to enable/disable features like stapling, duplex printing, color settings, and the like. Pre-configuration generally follows a process that includes generating a configuration file (or config file) that, for example, is identified by a filename with a "cfg" suffix. The config file contains, among other things, device configuration settings. During installation on the print server, the config file is read and the settings therein applied. The config file is generally distributed by device manufacturers.

Modern computer operating systems, such as those from The Microsoft Corporation, have a process wherein they certify device drivers by $3^{rd}$ parties that are distributed to client devices. One such driver certification process is performed by Microsoft Windows Hardware Quality Labs (WHQL). WHQL certification involves, in part, the application of a digital signature to the driver package including any default configuration files distributed with the driver. If an administrator wishes to use a custom configuration file that differs from the WHQL certified package, modification of the configuration file invalidates the package's digital signature and thus the WHQL certification. Distributing a driver which is no longer WHQL certified has adverse implications in many operating systems including preventing the driver from being installed. Additionally, non-point and print-based print servers, such as Novell NDPS or Novell iPrint (by Novell Inc.), do not have the ability to change print default settings after installation of the driver on the print server or on client devices. Such print servers require each printer object on the client devices to be deleted, the print drivers removed and reinstalled.

After distribution and installation of print drivers across an enterprise network, enterprise-wide print driver defaults sometimes need to be changed. Examples of an enterprise-wide change of print driver defaults include a corporate policy change that specifies that all color printers are to be set to default monochrome setting. The inability to change printing defaults in such non-point and print-based servers has prompted the creation of tools that "clean-up" environments on client devices. Deployment and operation of these tools is a painstaking process, especially in large enterprise environments.

Accordingly, what is needed in this art are increasingly sophisticated systems and methods for supporting the change of printing defaults in pre-defined print drivers across an enterprise network of print devices.

BRIEF SUMMARY

What is disclosed is a novel system and method for configuring a client print queue in a networked printing environment. One embodiment hereof utilizes a network based central storage of driver configuration files that can be updated at any time by an administrator. These configuration files are stored at an enterprise accessible location and accessed by client devices prior to utilizing a network accessible printer. In one embodiment, each print server is configured with a specification of the enterprise accessible location that contains the print driver configuration files. Client devices receive a specification of the enterprise accessible location from the print server as part of the printing process. Once the client device receives the enterprise accessible location from the print server, the configuration files are used to configure printing defaults. Alternative embodiments store these configuration files in default directories on each client device.

In one example embodiment, the present method for configuring a client print queue in a networked printing environment includes a client print queue on a client device that is initialized to correspond to a server print queue that is placed in communication with the client device over a network. The server print queue is configured with a default location of a configuration file containing at least one print queue configuration parameter. The client device is commanded to utilize the client print queue and, in response thereto, receives the default location of the configuration file from the server print queue. Thereafter, the client device retrieves at least one print queue configuration parameter from the configuration file. The client print queue is then configured according to the retrieved print queue configuration parameter.

Advantageously, the present method effectively enables a network administrator to readily reconfigure client print queues post-installation on the client devices. Applications that benefit from this ability is in "partial print provider" environments such as Novell NDPS, iPrint, and Microsoft IPP. Many partial print provider environments do not inherently support automated reconfiguration of already installed printer queues on client devices. Reconfiguration of client print queues after installation on client devices in partial print provider environments generally requires time consuming actions, such as the manual deletion of client side print queues to push out new default configurations to those clients.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
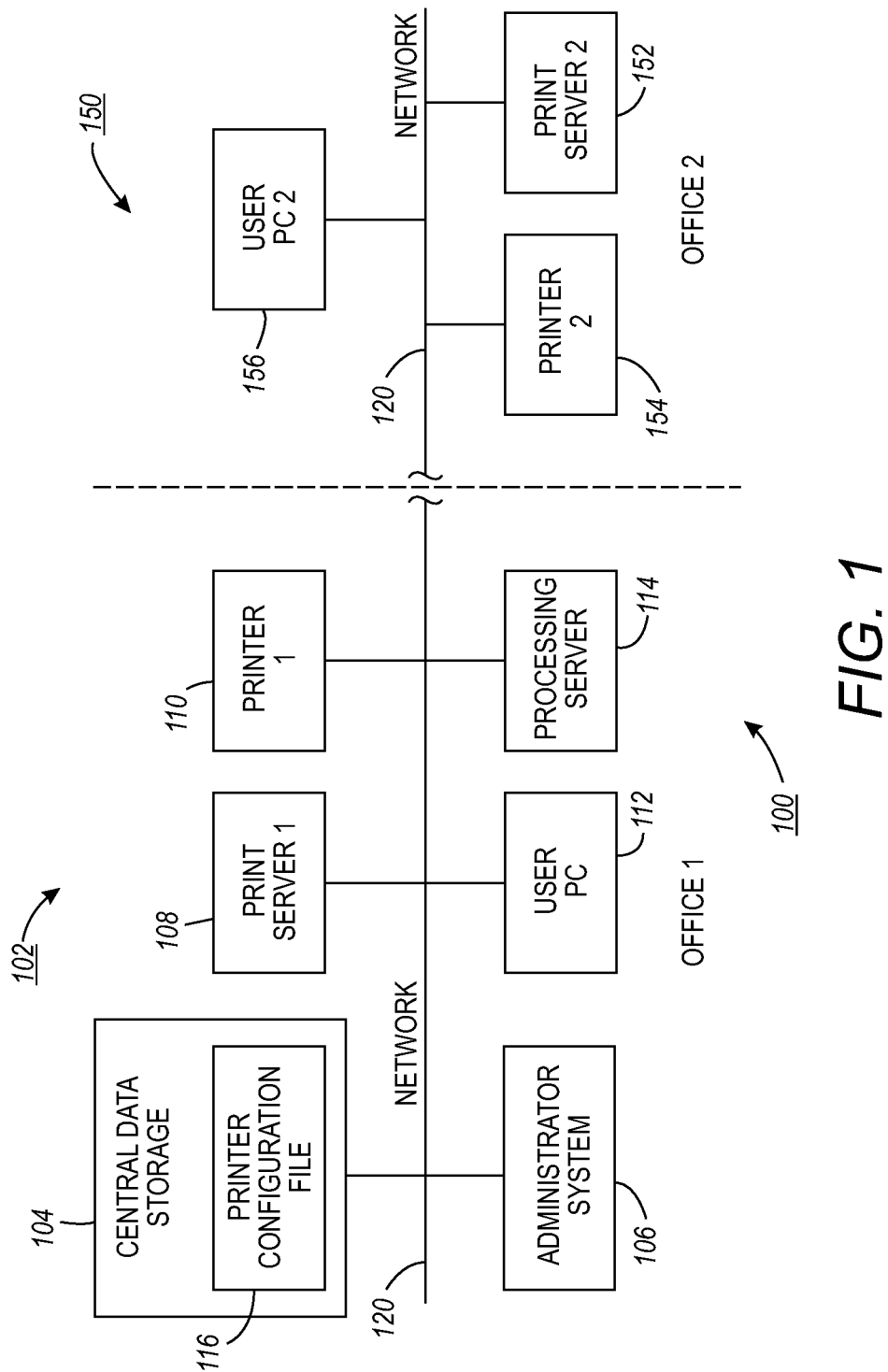
FIG. 1 is a network diagram of an example networked printing environment wherein one embodiment of the present method for configuring a client print queue will likely find its intended implementation.

What is provided are a system and method for configuring a client print queue in a networked printing environment.

It should be understood that one of ordinary skill in this art should be readily familiar with the development, configuration, administration and operation of network data file sharing and computer printer driver software used to establish print queues associated with computer printers connected to client devices over a data communications network. One of ordinary skill would also be knowledgeable about computer science, and software and hardware programming systems and methods sufficient to implement the functionality and capabilities described herein in their own document system environments without undue experimentation.

DEFINITIONS

"Network Connected Printer" refers to a print device that is able to accept data over a communications network and produce an output, such as a print on a media substrate. Network connected printers are able to be connected to any suitable communications network such as wired or wireless networks that are either dedicated or shared.

"Client Device" refers to any computational device that is able to send print jobs to a network connected printer. Client devices include, for example a personal computer, workstations, processing systems such as servers, distributed processors, computing clusters, and the like, that execute programs that generate data to be sent to a printer. Such systems are capable of hosting, for instance, databases, document generation systems, and any suitable processing able to generate data.

"Print Server" refers to a processing device that hosts queues for network connected printers. Print servers can be stand alone processors or exist as one or more processes resident on a server. Print servers are generally accessible by client devices and provide print driver packages to clients in order to support establishing print queues on the client device.

"Server Print Queue" refers to a print queue that is installed on a print server. Server print queues generally maintain and update queue configuration and status information that is distributed to client print queues.

"Client Print Queue" refers to a queue that is created on a client device to use a network connected printer. A client print queue is created in conjunction with a print driver for a given printer that is the destination of the client print queue. A client print queue accepts data sent to an associated networked printer and manages the transmission of the data to that device to implement the printing of the data. Client print queues receive configuration and status information from a server print queue and receive default configuration data from a network accessible configuration file.

"Enterprise" refers to an organization or other entity for which client devices are centrally administered. An enterprise includes, for example, a corporation, association of individuals, or a association of devices that share a mutually accessible data communications network.

"Enterprise Accessible Location" refers to a data storage location that is accessible by client devices connected to a communications network of an enterprise. An example enterprise accessible location is a shared network directory.

"Default Location" refers to a default enterprise accessible location configured into a server print queue wherein a configuration file to be used by client print queues is stored. An example default location would be, for instance, the location given by: "e:\system\device\".

"Configuration File" (or "Config File") refers to data containing configuration information specific for a target device driver or print queue. Configuration files are able to be located at an enterprise accessible location for use by one or more client print queues.

"Print Queue Configuration Parameter" refers to a setting for the configuration of a print queue. Example configuration parameters include, for example, settings for single-sided printing, duplex mode, color or monochrome, stapling multiple page printouts, and the like.

One aspect of the present method allows a network administrator to pre-configure or reconfigure default configuration parameters for client print queues by establishing (or modifying) a centrally located configuration file that is not part of the distributed print drivers. The present method utilizes print drivers that access the centrally accessible configuration file post-installation of the driver. This aspect allows a standard print driver to be installed on the print servers for each printer, and that standard print driver is then downloaded to the client devices. The standard print driver of one embodiment updates the default configuration of the installed print queue by accessing the configuration file which came with the driver package. This allows the standard print driver to include either no configuration file or a standard configuration file that does not reflect the actual default configuration that will be in place for the client device. The WHQL certified driver is then able to be distributed and installed on client devices. The digital signature is validated during the installation of the print driver on the client device. After the print driver installation in one embodiment, the print driver accesses the server print queue on a print server to obtain printer status data and, in one embodiment, retrieve the enterprise accessible location containing the configuration file to be used. The print driver then accesses the configuration files stored in the enterprise accessible location to configure printing defaults for the corresponding queue on the client device.

As is generally known by practitioners of ordinary skill in the relevant arts, changing a configuration file packaged with a print driver that has already been certified and given a digital signature, such as is part of the Microsoft WHQL certification, causes the digital signature of the certified driver package to become invalid. The digital signature becomes invalid because modifications have been made to the files after the digital signature was applied and any modifications break the security catalog that is provided by the digital signee. Operating systems that recognize digitally signed device drivers often impede the installation of device drivers that do not have a proper digital signature. Attempting to install a device driver without a proper digital signature generally gives rise to one of two scenarios based upon computer configuration. A first scenario allows an installing user to disregard a warning of an uncertified driver and install the driver and apply the preconfigured defaults. This scenario gives rise to consequences that may range from a user interface interaction requirement on each user, which is an inconvenience, to an inability to install the driver on certain platforms that require digital signatures for all drivers, which is a critical failure.

EXAMPLE DISTRIBUTED INFORMATION SYSTEM ENVIRONMENT

Reference is now made to FIG. 1, which is a network diagram 100 for an embodiment for a distributed information system implementing one embodiment of the present method. A first location, indicated as Office-1 102, is shown to include a number of communications network connected systems as is described below. A second location, indicated as Office-2 150, is similarly shown to include additional communications network connected systems, as is described below. Office-1 and Office-2 may be co-located in close proximity to each another or at a distance from one another according to the needs of an enterprise.

The network connected systems of the network diagram 100 are connected by a communications network 120 that provides a data communications network among various computing resources such as client devices, including User PC-1 112 and processing server 114, and printer-1 110 and print server-1 108. The processing server includes, for instance, a server that hosts one or more operational programs, including databases, accounting systems, and the like, and that produces definitions of documents to print on a printer, such as printer-1. The User PC-1 is, in one embodiment, a conventional personal computer, as widely known in commerce, able to install one or more print drivers that support the present method, as is described below. A central data storage 104, in one embodiment, is an enterprise accessible storage location that stores a printer configuration file 116. In one embodiment, the printer configuration file stores printer configuration data that is accessed by all computers using printers on a network and the configuration data is applied by the print drivers on all computers to ensure an enterprise-wide printer configurations.

An administrator system 106 is used by administrators to, for example, create and/or modify the printer configuration file. An administrator is able to establish and/or modify, for example, enterprise-wide printing defaults by specifying the desired defaults in the printer configuration file. As described below, the print drivers installed through an enterprise are able to be automatically configured, through configuration of print servers associated with respective printers, to conform to the printing defaults specified in the printer configuration file stored in the central data storage. In one embodiment, the administrator system, or a properly authorized system administrator account on any workstation, has access to a new administrator-only accessible feature of the print drivers installed on, for example, print server-1 that allow the system administrator to configure the associated print queue to provide a specification of a location of a central data storage that stores a configuration file. In one embodiment, the specification of the location of the central data storage is a UNC network path. Alternative embodiments are able to specify, for example, a local folder on the user's client device, such as a temporary folder, a user profile, etc. The central data storage is referred to as a "file store" for the remainder of this discussion.

In one embodiment, print server-1 is configured to support operation of printer-1 in a conventional manner that is modified according to the present method, as is described herein. For example, in one embodiment, print server-1 establishes a queue for printer-1. When, for example, a user of User PC-1 first desires to print a job on printer-1, the user installs a print driver and creates a client print queue for printer-1 on the User PC-1. In one embodiment, the User PC-1 retrieves and installs a print driver for printer-1 that is obtained from print server-1. In this example, when User PC-1 subsequently desires to print a document on printer-1, the print queue installed on User PC-1 retrieves queue information from print sever-1. The operation of the present method also causes the client print queue installed on User PC-1 to download, along with the printer queue information from print server-1, a specification of the location of the central data storage where the printer configuration file is stored. The print driver installed on the User PC-1 will use the configuration information stored in the printer configuration file to configure defaults for the printer queue installed on the User PC-1. Printer installation and reconfiguration for processes operating on the processing server operate similarly to the printer operations described above.

One embodiment of the present system and method further allows the administrator to specify an interval at which the client print queue, after the user accesses the print queue for printing or after the user accesses their printing preferences, is to access the central data storage to determine if an update to the configuration file exists. In such embodiments, if the interval since the central data storage was last checked has elapsed, the client print queue queries the central data storage and applies any changes made to the configuration file stored therein. In one example, the specification of the interval between accessing the central data storage to identify updates to the configuration file is stored within the system registry on the client devices. This system registry is also used to track timestamps of such access to determine the time that has elapsed since the last checking of the configuration file. Specifying an interval to identify updates to configure file facilitates operations not only for users with desktops that are always connected to the company network 120, but also supports mobile users that periodically connect to the network 120. When a mobile user connects to the network and the interval set by the administrator is determined to have elapsed, any updates to the configuration file determined and applied.

Office-2 150 in one embodiment is remote from Office-1 102 and connected by, in one example, a wide area network included within data network 120. Office-2 includes printer-2 154 and associated print server-2 152. Printer-2 and print server-2 operate in a similar manner as printer-1 and print server-1 described above. User PC-2 156, which is also located in Office-2 and therefore close to printer-2, generally uses printer-2 to print documents. The operation of User PC-2 in installing and maintaining printer queues for printer-2 is similar to that described above for User PC-1. In particular, User PC-1 and User PC-2 both access the same printer configuration file located in the central data storage and therefore will have the same printer configuration defaults. Enterprise-wide updating of printer configuration defaults across multiple offices, such as Office-1 and Office-2, is readily and automatically accomplished by modifying only the printer configuration file stored in the central data storage.

EXAMPLE FLOW DIAGRAM

Figure 2:
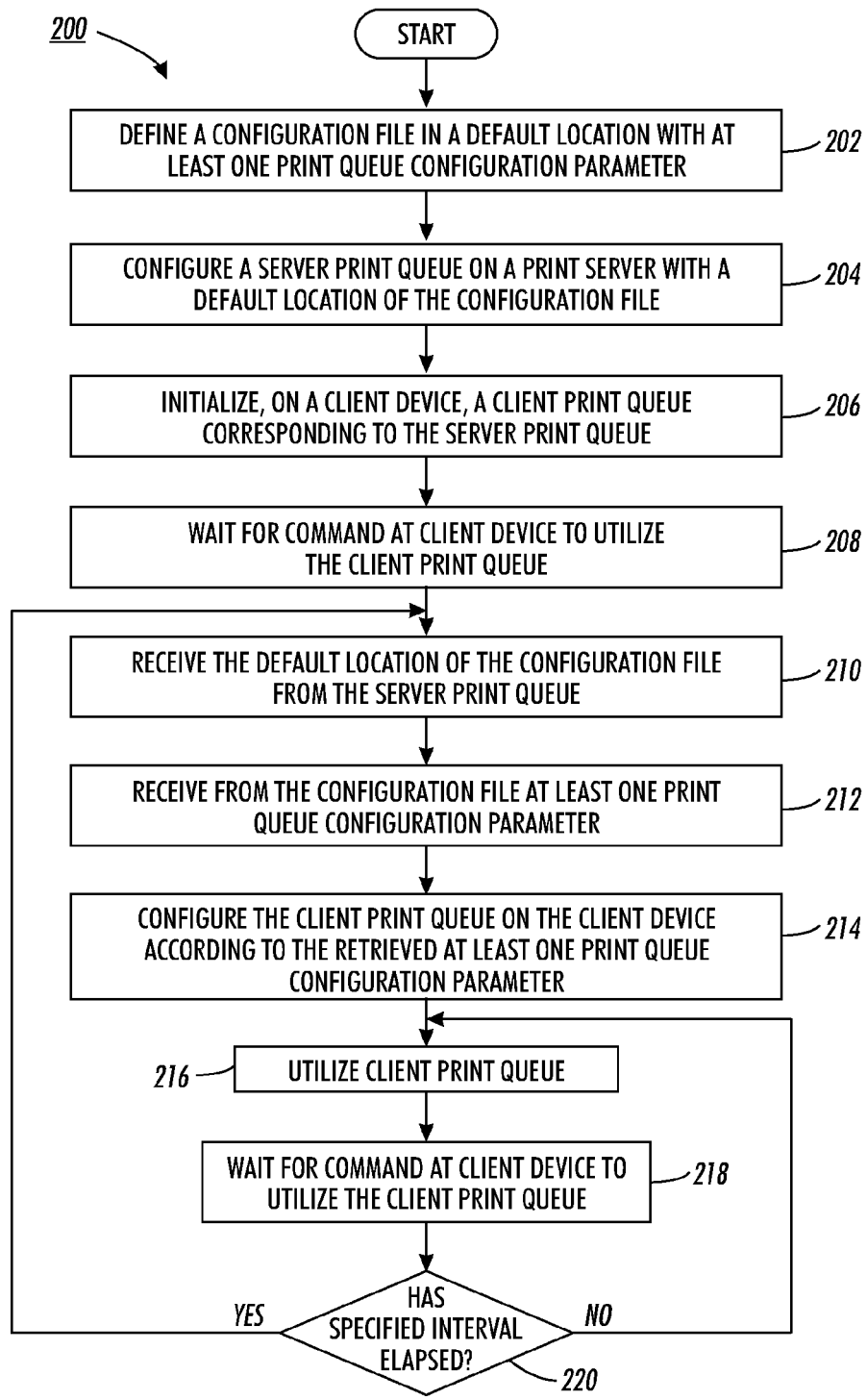
FIG. 2 illustrates an example flow diagram of one embodiment of the present client print queue configuration method.

Reference is now made to FIG. 2, which illustrates a processing flow diagram 200 of one embodiment of the present client print queue configuration method.

At 202, a configuration file containing at least one print queue configuration parameter is defined in a default location. The configuration file, such as configuration file 116 of FIG. 1, contains centrally administered default configuration parameters for printer queues operating on client devices across the enterprise. In one embodiment, a system administrator using administrator system 106 defines, creates, initially populates the configuration file across the enterprise network. The administrator is also subsequently able to modify the configuration file. In one embodiment, various security parameters for the printer configuration file and the central data storage 104 in general are set to allow all computing users to access the printer configuration file by only allow an administrator to create and/or modify files in the central data storage, such as the printer configuration file.

At 204, a server print queue on a print server is configured with the default location of the configuration file. In one embodiment, configuration of the server print queue with the default location of the configuration file is performed when the server print queue is installed on the print server, such as print server-1, for a particular printer, such as printer-1. In the illustrated example, print server-1 provides the print driver for client print queues, such as are installed on User PC-1 and processing server 114, with a specification of the central data storage 104. Providing the specification of the location of the central data storage to the User PC-1 and the processing server allows those drivers to access and obtain configuration information from the printer configuration file 116. The print driver of one embodiment is configured to not use configuration information that is stored locally on the print server-1 110 or the client device but to rather use the configuration information provided in the centrally stored and maintained configuration file.

At 206, a client print queue corresponding to the server print queue is initialized on a client device. In one embodiment, the print queue is initialized through ordinary processing.

At 208, the local print driver waits for a command at the client device to utilize the client print queue. A command to utilize the print queue is able to involve, for example, a user commanding the printing of a document.

At 210, the default location of the configuration file is received from the server print queue. In one embodiment, the default location of the configuration file is a central data storage 104 that is accessible by a network 120, including wide area networking facilities, by any client device utilizing a printer connected to the network.

At 212, at least one print queue configuration parameter is retrieved from the configuration file. Retrieval of the at least one print queue configuration parameter involves opening the config file and reading the information contained therein.

At 214, the client print queue on the client device is configured according to the retrieved at least one print queue configuration parameter. After configuration, at 216, the client print queue is utilized, such as by printing a desired document on the printer.

At 218, the processing waits for a command to attain utilize the client print queue. After a command to utilize the client print queue is received, a determination is made, at 220, if the specified interval for checking configuration file for changes has elapsed. If the interval for checking for changes to configuration file 116 has elapsed, the processing returns to receiving, at 210, the default location of the configuration file from the server print queue. The processing then proceeds with the above described subsequent processing. If the interval for checking for changes to configuration file has not elapsed, the processing returns to, at 216, utilizing the client print queue. Thereafter, further processing of the embodiment ends.

VARIOUS EMBODIMENTS

Figure 3:
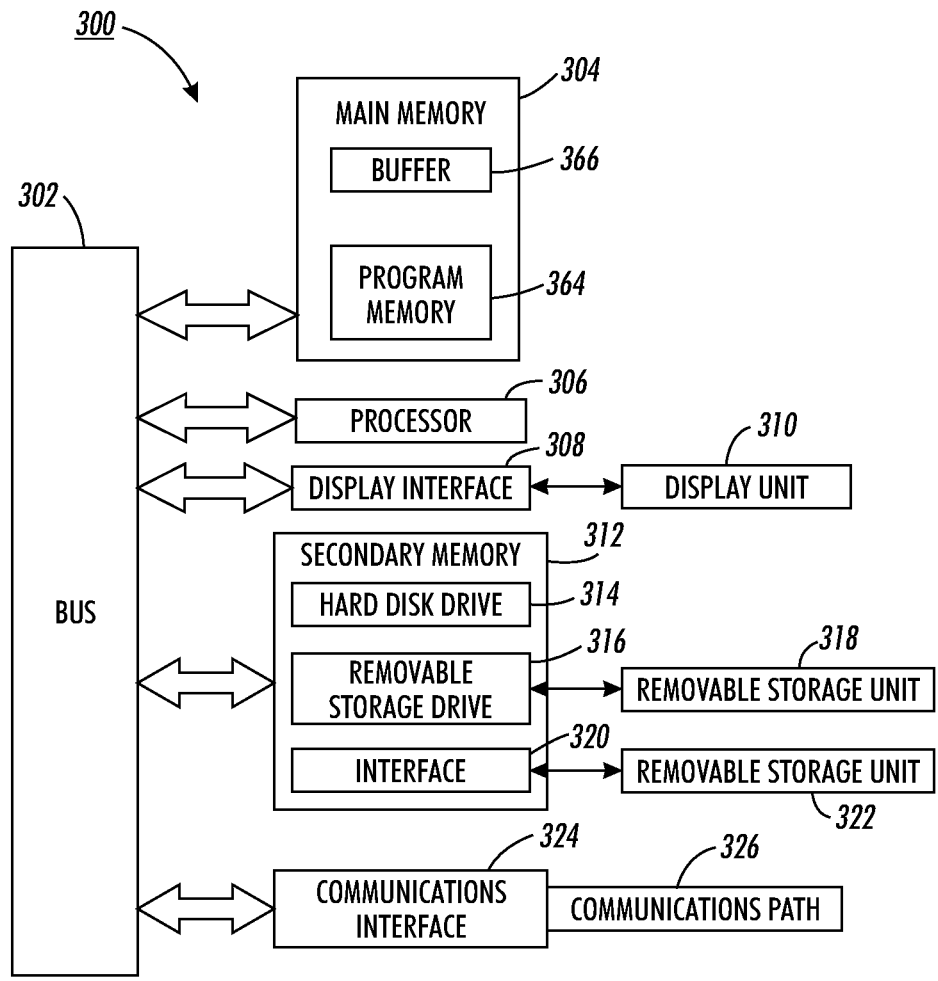
FIG. 3 illustrates a block diagram of one example embodiment of a special purpose computer useful for implementing one or more aspects of the present method.

Reference is now made to FIG. 3 which illustrates a block diagram 300 of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the present method as described in FIG. 1 and the flow diagram of FIG. 2.

Special purpose computer system 300 includes processor 306 for executing machine executable program instructions for carrying out all or some of the present method. The processor is in communication with bus 302. The system includes main memory 304 for storing machine readable instructions. Main memory may comprise random access memory (RAM) to support reprogramming and flexible data storage. Buffer 366 stores data addressable by the processor. Program memory 364 stores machine readable instructions for performing the present method. A display interface 308 forwards data from bus 302 to display 310. Secondary memory 312 includes a hard disk 314 and storage device 316 capable of reading/writing to removable storage unit 318, such as a floppy disk, magnetic tape, optical disk, etc. Secondary memory 312 may further include other mechanisms for allowing programs and/or machine executable instructions to be loaded onto the processor. Such mechanisms may include, for example, a storage unit 322 adapted to exchange data through interface 320 which enables the transfer of software and data. The system includes a communications interface 324 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 326 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for configuring a client print queue in a networked printing environment, the method comprising:
   initializing a client print queue on a client device to correspond to a server print queue placed in communication with the client device over a network;
   configuring the server print queue with a default location of a configuration file containing at least one print queue configuration parameter; and
   in response to the client device being commanded to utilize the client print queue, the client device performing:
      establishing an interval for retrieving at least one print queue configuration parameter from said configuration file;
      receiving, from the server print queue, the default location of the configuration file;
      retrieving, from the configuration file, the at least one print queue configuration parameter; and
      configuring the client print queue according to the retrieved at least one print queue configuration parameter, wherein said retrieving and configuring of said client print queue are repeated after said interval elapses.

2. The method of claim 1, further comprising any of:
   modifying at least one print queue configuration parameter in the configuration file; and
   adding a new print queue configuration parameter to the configuration file.

3. The method of claim 1, further comprising saving the print queue configuration parameter to default location.

4. The method of claim 1, further comprising re-configuring the server print queue with a new default location of the configuration file.

5. The method of claim 1, further comprising using a user interface to set any of the default location of the configuration file and the print queue configuration parameters.

6. The method of claim 1, further comprising querying, by the client device, the server print queue for the location of the configuration file.

7. A system for configuring a client print queue in a networked printing environment, the system comprising:
   a memory;
   a storage medium for storing data; and
   a processor in communication with said storage medium and said memory, said processor executing machine readable instructions for performing the method of:
      initializing a client print queue on a client device to correspond to a server print queue placed in communication with the client device over a network;
      configuring the server print queue with a default location of a configuration file containing at least one print queue configuration parameter; and
      in response to the client device being commanded to utilize the client print queue, the client device performing:
         establishing an interval for retrieving at least one print queue configuration parameter from said configuration file;
         receiving, from the server print queue, the default location of the configuration file;
         retrieving, from the configuration file, the at least one print queue configuration parameter; and
         configuring the client print queue according to the retrieved at least one print queue configuration parameter, wherein said retrieving and configuring of said client print queue are repeated after said interval elapses.

8. The system of claim 7, wherein the method further comprises any of:
   modifying at least one print queue configuration parameter in the configuration file; and
   adding a new print queue configuration parameter to the configuration file.

9. The system of claim 7, wherein the method further comprises saving the print queue configuration parameter to default location.

10. The system of claim 7, wherein the method further comprises re-configuring the server print queue with a new default location of the configuration file.

11. The system of claim 7, wherein the method further comprises using a user interface to set any of the default location of the configuration file and the print queue configuration parameters.

12. The system of claim 7, wherein the method further comprises querying, by the client device, the server print queue for the location of the configuration file.

13. A method for configuring a client print queue in a networked printing environment, the method comprising:
   downloading, on a client device from a print server in communication with the client device over a network, a print driver comprising a digital signature;
   initializing a client print queue on the client device to correspond to a server print queue on the print server;
   configuring the server print queue with a default location of a configuration file containing at least one print queue configuration parameter; and
   in response to the client device being commanded to utilize the client print queue, the client device performing:
      establishing an interval for retrieving at least one print queue configuration parameter from said configuration file;
      receiving, from the server print queue, the default location of the configuration file;
      retrieving, from the configuration file, the at least one print queue configuration parameter; and
      configuring the client print queue according to the retrieved at least one print queue configuration parameter, wherein said retrieving and configuring of said client print queue are repeated after said interval elapses.

14. The method of claim 13, further comprising any of:
   modifying at least one print queue configuration parameter in the configuration file; and
   adding a new print queue configuration parameter to the configuration file.

15. The method of claim 13, further comprising saving the print queue configuration parameter to default location.

16. The method of claim 13, further comprising re-configuring the server print queue with a new default location of the configuration file.

17. The method of claim 13, further comprising using a user interface to set any of the default location of the configuration file and the print queue configuration parameters.

* * * * *